United States Patent [19]

van Belzen et al.

[11] Patent Number: 4,566,309

[45] Date of Patent: Jan. 28, 1986

[54] APPARATUS AND METHOD FOR MONITORING A PRESSURE SENSOR

[75] Inventors: David van Belzen, Hemmingen; Gerhard Lotterbach; Jan F. van Woudenberg, both of Markgröningen; Udo Zucker, Güglingen, all of Fed. Rep. of Germany

[73] Assignee: Robert Bosch GmbH, Stuttgart, Fed. Rep. of Germany

[21] Appl. No.: 511,056

[22] Filed: Jul. 5, 1983

[30] Foreign Application Priority Data

Jul. 17, 1982 [DE] Fed. Rep. of Germany ....... 3226849

[51] Int. Cl.⁴ .............................................. G01L 27/00

[52] U.S. Cl. .................................. 73/4 R; 340/52 F; 340/60

[58] Field of Search ................. 340/60, 52 F, 626, 59, 340/611; 73/115, 4 R

[56] References Cited

U.S. PATENT DOCUMENTS

| | | | |
|---|---|---|---|
| 3,631,388 | 12/1971 | Strong | 340/60 |
| 3,634,881 | 1/1972 | Cline | 340/60 |
| 3,868,625 | 2/1975 | Speigner et al. | 340/626 |
| 3,935,558 | 1/1976 | Miller et al. | 340/626 |
| 4,189,707 | 2/1980 | Ermert | 340/60 |
| 4,246,566 | 1/1981 | Endo et al. | 340/52 F |
| 4,398,174 | 8/1983 | Smith, Jr. | 340/60 X |

FOREIGN PATENT DOCUMENTS 2090978 7/1982 United Kingdom .

*Primary Examiner*—James L. Rowland
*Assistant Examiner*—Brian R. Tumm
*Attorney, Agent, or Firm*—Edwin E. Greigg

[57] ABSTRACT

A pressure sensor is disposed downstream of a throttle valve in the intake tube of an internal combustion engine. When the throttle valve is closed, a throttle valve switch generates a logic signal. A monitoring of the pressure sensor is effected in that upon the simultaneous occurrence of the logic signal and a pressure signal which corresponds to an abnormal or a physically impossible state when the throttle valve is closed, an alarm is triggered.

33 Claims, 2 Drawing Figures

11
10
12
13
14
α=0
22
15
16
P
17
19
20
18
21
23
EMERGENCY OPERATION 23
11
10
12
13
14
α=0
22
15
16
P
24
19
20
18
21

APPARATUS AND METHOD FOR MONITORING A PRESSURE SENSOR

BACKGROUND OF THE INVENTION

The invention is based on an apparatus and method as defined generally hereinafter.

The use of pressure sensors for regulating internal combustion engines in motor vehicles is known, the pressure sensors being disposed in the intake tube of the engine. These pressure sensors furnish signals for a control circuit, which serves to exert influence on the ignition, injection, transmission control or the like. It is also known to assign a throttle valve switch to the throttle valve in the intake tube of the engine, the switch thus indicating the state where the throttle valve is closed.

When a pressure sensor of this type is used for open- and closed-loop control functions of the internal combustion engine, however, significant malfunctioning can occur if the pressure sensor or its inflow or supply lines are defective. Especially dangerous are states in which a defective pressure sensor brings about an acceleration of the motor vehicle.

OBJECT AND SUMMARY OF THE INVENTION

The apparatus and method according to the invention has the advantage over the prior art that monitoring of the pressure sensor is always performed whenever the driving pedal is released or the throttle valve is closed.

In a preferred embodiment of the invention, the signal of the defective pressure sensor is suppressed if an alarm signal occurs, and an emergency operation function of the engine is activated. Thus the particular malfunction in which an acceleration of the vehicle is effected by a defective pressure sensor is countered in an optimal fashion in terms of human engineering, because in such a situation the driver will instinctively raise his foot from the pedal, and with the throttle valve then being closed the failure of the pressure sensor will be discovered and the emergency operation function will be activated.

By means of the suitable definition of physically impossible pressure valves, the apparatus according to the invention can be used in many types of internal combustion engines, including those provided with a turbocharger.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
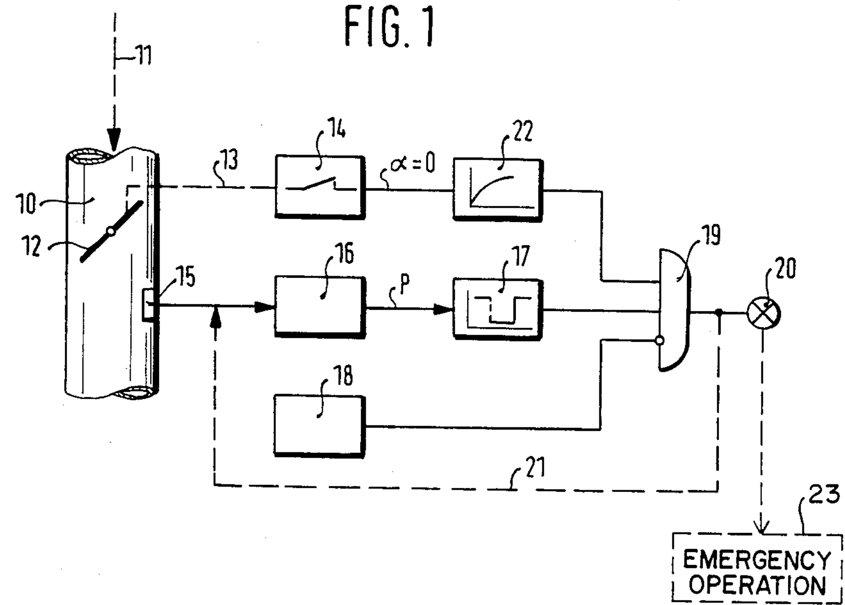
FIG. 1 is a partial schematic and block circuit diagram of one embodiment of the invention.

In FIG. 1, the intake tube of an internal combustion engine is identified as 10, and 11 indicates the air inlet of the air supplied to the engine. A throttle valve 12 is located in the intake tube 10 and is connected via a linking rod 13 with a throttle valve switch 14 of known design for detecting the throttle valve position $\alpha$. The throttle valve switch 14 is dimensioned such that whenever the throttle valve 12 is closed it generates a positive logic signal. A pressure sensor 15 is also disposed in the intake tube 10, downstream of the throttle valve 12. The pressure sensor 15 is connected to an evaluation circuit 16, of known design which at its output emits an electrical signal corresponding to the pressure p in the intake tube. This signal p is delivered to a first threshold stage 17, the threshold of which is dimensioned such that above a first value—which preferably corresponds to the ambient pressure $p_0$ and in a preferred embodiment of the invention below a second pressure value $p_1$ corresponds to the minimum pressure occurring at maximum aspiration on the part of the engine—a positive logic signal is generated. Finally, a signal transducer 18 is also provided, which during the starting phase of the engine also emits a positive logic signal. The output of the throttle valve switch 14, the evaluation circuit 16 and the signal transducer 18 are carried to inputs of an AND gate 19, the input associated with the signal transducer 18 being inverted. The output of the AND gate 19 controls alarm means, which is symbolized by a display 20 and which is capable via a control line 21 of exerting an impeding influence on the further transmission of the signal of the pressure sensor 15. Shown in phantom is a circuit connection from the display—alarm means to an emergency operation control circuit 23.

In a further feature of the invention, finally, a delay member 22 is also disposed at the output side of the throttle valve switch 14.

The mode of operation of the apparatus shown in FIG. 1 includes the following steps:

When the throttle valve 12 is closed ($\alpha=0$), the pressure downstream of the throttle valve 12 is always less than the ambient pressure $p_0$. With a closed throttle valve 12, the pressure is measured, and an alarm signal is emitted whenever the pressure p is abnormal, that is, greater than the ambient pressure $p_0$. This monitoring of the pressure sensor 15 is realized electronically in that the outputs of the throttle valve switch 14 and of the evaluation circuit 16 are linked in the AND gate 19 and in AND function with one another. Since different physical conditions prevail during engine starting, this monitoring of the pressure sensor 15 is suppressed for the duration of the starting phase via the inverting input of the AND gate 19 and the signal transducer 18. Finally, a further increase in functional reliability is attained in a preferred embodiment of the invention by means of the delay member 22, by providing that a monitoring operation is performed only when the throttle valve switch 14 has been closed for a certain minimum length of time and stationary conditions have thus been established downstream of the throttle valve 12.

A further physically impossible pressure value when the throttle valve 12 is closed is a value which is below a minimum pressure $p_1$ occurring at high aspiration on the part of the engine. This minimum pressure $p_1$ occurs, for instance, if with the throttle valve 12 closed the vehicle is traveling downhill with engine braking or is idling. In a preferred embodiment of the invention, this physically impossible state can therefore also be put to use for detecting failure of the pressure sensor 15.

Figure 2:
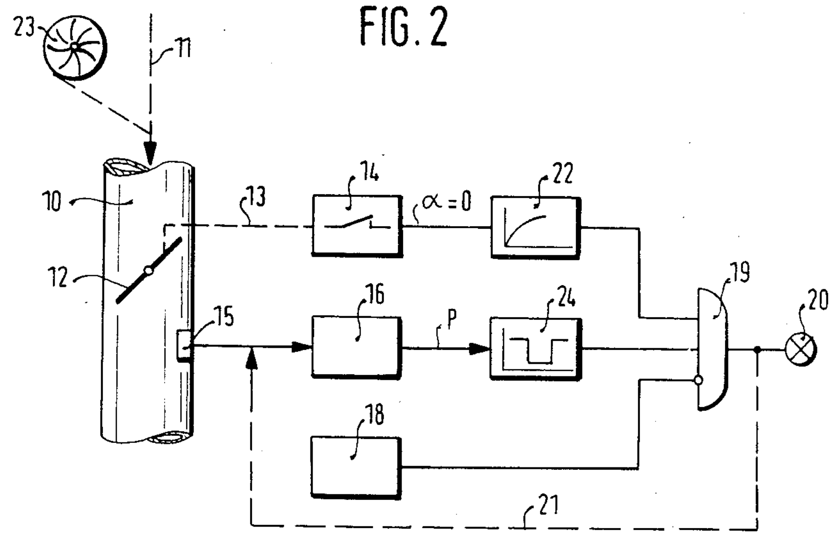
FIG. 2 is a partial schematic and block circuit diagram illustrating another embodiment of the invention.

The apparatus shown in FIG. 2 is substantially identical to that shown in FIG. 1, and identical elements are provided with identical reference numerals. As is apparent from the drawing, the sole difference from the apparatus of FIG. 1 is that a turbocharger 23 is provided at the entrance to the intake tube 10, and the second threshold stage 24 has different response values. The upper response value of the second threshold stage 24 in fact corresponds to the sum $p_2$ of the ambient pressure $p_0$ and the maximum charge pressure of the turbocharger 23, while the lower response value is again preferably equal to the pressure value which occurs in the event of maximum aspiration on the part of the engine. In this embodiment as well, the alarm means are triggered in the event of a value exceeding the upper value or failing to attain the lower value.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for monitoring a pressure sensor disposed downstream of a throttle valve in an intake tube of an internal combustion engine comprising, a throttle valve switch means for generating a logic signal when said throttle valve is closed, means for supplying an abnormal pressure signal from said pressure sensor, and means responsive to the simultaneous occurrence of said logic signal ($\alpha=0$) and said abnormal pressure signal for triggering an alarm means.

2. An apparatus as defined by claim 1, wherein said alarm means comprises further means for suppressing said pressure signal and for activating an emergency operation function of said engine.

3. An apparatus as defined by claim 1, wherein said logic signal of said throttle valve switch is subjected to a delay transmission means.

4. An apparatus as defined by claim 2, wherein said logic signal of said throttle valve switch is subjected to a delayed transmission means.

5. An apparatus as defined by claim 2, wherein said alarm means is triggered whenever said pressure signal corresponds to a pressure (p) in said intake tube which is greater than the ambient pressure ($p_0$).

6. An apparatus as defined by claim 3, wherein said alarm means is triggered whenever said pressure signal corresponds to a pressure (p) in said intake tube which is greater than the ambient pressure ($p_0$).

7. An apparatus as defined by claim 1, wherein said alarm means is triggered whenever said pressure signal corresponds to a pressure (p) in said intake tube which is less than a minimum pressure ($p_1$) occurring at high aspiration on the part of said engine.

8. An apparatus as defined by claim 2, wherein said alarm means is triggered whenever said pressure signal corresponds to a pressure (p) in said intake tube which is less than a minimum pressure ($p_1$) occurring at high aspiration on the part of said engine.

9. An apparatus as defined by claim 3, wherein said alarm means is triggered whenever said pressure signal corresponds to a pressure (p) in said intake tube which is less than a minimum pressure ($p_1$) occuring at high aspiration on the part of said engine.

10. An apparatus as defined by claim 1, further comprising a turbocharger disposed upstream of said throttle valve, said alarm means being triggered whenever said pressure signal corresponds to a pressure (p) which is greater than the sum ($p_2$) of the ambient pressure ($p_0$) and the maximum charge pressure.

11. An apparatus as defined by claim 2, further comprising a turbocharger disposed upstream of said throttle valve, said alarm means being triggered whenever said pressure signal corresponds to a pressure (p) which is greater than the sum ($p_2$) of the ambient pressure ($p_0$) and the maximum charge pressure.

12. An apparatus as defined by claim 3, further comprising a turbocharger disposed upstream of said throttle valve, said alarm means being triggered whenever said pressures signal corresponds to a pressure (p) which is greater than the sum ($p_2$) of the ambient pressure ($p_0$) and the maximum charge pressure.

13. An apparatus as defined by claim 1, further comprising a turbocharger disposed upstream of said throttle valve, said alarm means being triggered whenever said pressure signal corresponds to a pressure (p) which is less than the minimum pressure ($p_1$) occurring at maximum aspiration on the part of said engine.

14. An apparatus as defined by claim 2, further comprising a turbocharger disposed upstream of said throttle valve, said alarm means being triggered whenever said pressure signal corresponds to a pressure (p) which is less than the minimum pressure ($p_1$) occurring at maximum aspiration on the part of said engine.

15. An apparatus as defined by claim 3, further comprising a turbocharger disposed upstream of said throttle valve, said alarm means being triggered whenever said pressure signal corresponds to a pressure (p) which is less than the minimum pressure ($p_1$) occurring at maximum aspiration on the part of said engine.

16. An apparatus as defined by claim 1, wherein means is provided for suppressing the monitoring of said pressure sensor during the starting phase of said engine.

17. An apparatus as defined by claim 2, wherein means is provided for suppressing the monitoring of said pressure sensor during the starting phase of said engine.

18. An apparatus as defined by claim 3, wherein means is provided for suppressing the monitoring of said pressure sensor during the starting phase of said engine.

19. An apparatus as defined by claim 4, wherein means is provided for suppressing the monitoring of said pressure sensor during the starting phase of said engine.

20. An apparatus as defined by claim 5, wherein means is provided for suppressing the monitoring of said pressure sensor during the starting phase of said engine.

21. An apparatus as defined by claim 6, wherein means is provided for suppressing the monitoring of said pressure sensor during the starting phase of said engine.

22. An apparatus as defined by claim 7, wherein means is provided for suppressing the monitoring of said pressure sensor during the starting phase of said engine.

23. An apparatus as defined by claim 8, wherein means is provided for suppressing the monitoring of said pressure sensor during the starting phase of said engine.

24. An apparatus as defined by claim 9, wherein means is provided for suppressing the monitoring of said pressure sensor during the starting phase of said engine.

25. An apparatus as defined by claim 10, wherein means is provided for suppressing the monitoring of said pressure sensor during the starting phase of said engine.

26. An apparatus as defined by claim 11, wherein means is provided for suppressing the monitoring of said pressure sensor during the starting phase of said engine.

27. An apparatus as defined by claim 12, wherein means is provided for suppressing the monitoring of said pressure sensor during the starting phase of said engine.

28. An apparatus as defined by claim 13, wherein means is provided for suppressing the monitoring of said pressure sensor during the starting phase of said engine.

29. An apparatus as defined by claim 14, wherein means is provided for suppressing the monitoring of said pressure sensor during the starting phase of said engine.

30. An apparatus as defined by claim 15, wherein means is provided for suppressing the monitoring of said pressure sensor during the starting phase of said engine.

31. A method for monitoring a pressure sensor disposed downstream of a throttle valve in an intake tube of an internal combustion engine, comprising the steps of, generating a logic signal in response to the closure of said throttle valve, supplying an abnormal pressure signal from said pressure sensor, sensing the simultaneous occurrence of said logic signal and said abnormal pressure signal, and triggering an alarm in response thereto.

32. A method according to claim 31, wherein said pressure signal corresponds to a pressure (p) in said intake tube which is greater than the ambient pressure ($p_0$).

33. A method according to claim 31, wherein said pressure signal corresponds to a pressure (p) in said intake tube which is less than a minimum pressure ($p_1$) occuring at high aspiration on the part of said engine.

* * * * *